United States Patent
Bosworth

(10) Patent No.: US 10,279,892 B2
(45) Date of Patent: May 7, 2019

(54) TILTROTOR AIRCRAFT HAVING ACTIVE WING EXTENSIONS

(71) Applicant: Bell Helicopter Textron Inc., Fort Worth, TX (US)

(72) Inventor: Jeffrey Bosworth, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 318 days.

(21) Appl. No.: 15/252,560

(22) Filed: Aug. 31, 2016

(65) Prior Publication Data

US 2018/0057148 A1 Mar. 1, 2018

(51) Int. Cl.
| | |
|---|---|
| *B64C 13/18* | (2006.01) |
| *B64C 3/38* | (2006.01) |
| *B64C 29/00* | (2006.01) |
| *B64C 7/02* | (2006.01) |

(52) U.S. Cl.
CPC ............. *B64C 13/18* (2013.01); *B64C 3/385* (2013.01); *B64C 7/02* (2013.01); *B64C 29/0033* (2013.01)

(58) Field of Classification Search
CPC ........... B64C 3/385; B64C 13/18; B64C 7/02; B64C 29/0033
See application file for complete search history.

(56) References Cited

U.S. PATENT DOCUMENTS

| | | |
|---|---|---|
| 1,846,992 A | 2/1932 | Decker |
| 3,107,882 A | 10/1963 | Matteson et al. |
| 3,181,810 A | 5/1965 | Olson |
| 3,666,209 A | 5/1972 | Taylor |
| 5,096,140 A | 3/1992 | Dornier, Jr. et al. |
| 5,141,176 A | 8/1992 | Kress et al. |
| 6,367,736 B1 | 4/2002 | Pancotti |
| 6,607,161 B1 | 8/2003 | Krysinski et al. |
| 6,641,365 B2 | 11/2003 | Karem |
| 7,802,754 B2 | 9/2010 | Karem |
| 8,083,172 B2 | 12/2011 | Karem |
| 8,366,049 B2 | 2/2013 | Karem |
| 9,102,401 B2 | 8/2015 | Collins et al. |
| 10,011,349 B2 * | 7/2018 | Ivans .................. B64C 29/0033 |
| 2006/0151272 A1 | 7/2006 | Smith et al. |
| 2013/0026302 A1 | 1/2013 | Lee et al. |

OTHER PUBLICATIONS

Agree, Jr. C.W.; Aerodynamic Limits on Large Civil Tiltrotor Sizing and Efficiency; Fifth Decennial AHS Aeromechanics Specialists' Conference; San Francisco, CA; Jan. 22-24, 2014.
Whittle, Richard; Meet Bell's V-247, Armed Tiltrotor Drone for Marines; Breaking Defense; Aug. 26, 2016.

* cited by examiner

*Primary Examiner* — Jelani A Smith
*Assistant Examiner* — Donald J Wallace
(74) *Attorney, Agent, or Firm* — Lawrence Youst PLLC

(57) ABSTRACT

A tiltrotor aircraft includes a fuselage supporting first and second wings each having an outboard end. First and second nacelles are respectively coupled to the outboard ends of the first and second wings. The first and second nacelles each have an outboard end. First and second wing extensions are rotatably coupled, respectively, to the outboard ends of the first and second nacelles. First and second actuators are operable to respectively move the first and second wing extensions to dampen a mode of the first and second wings, thereby stabilizing the tiltrotor aircraft.

17 Claims, 7 Drawing Sheets

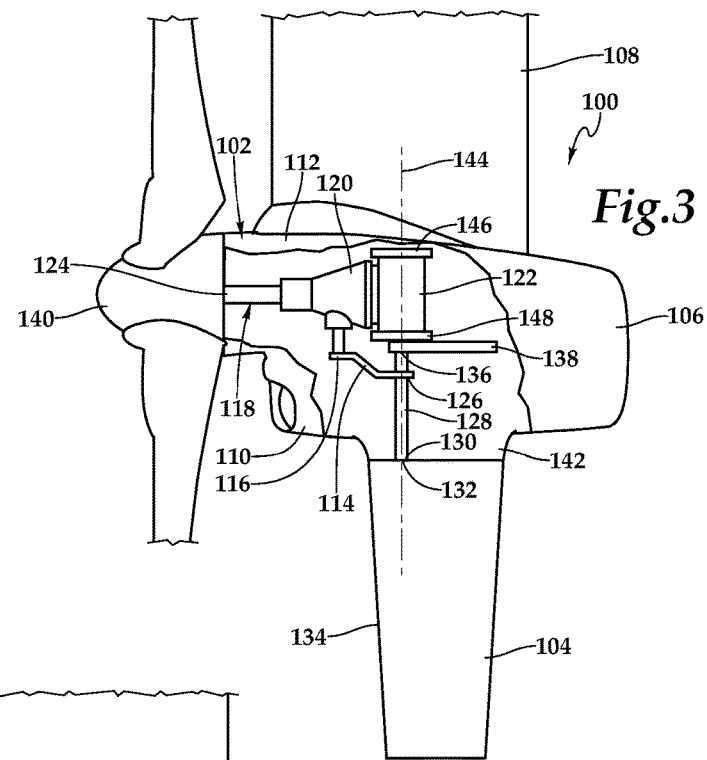
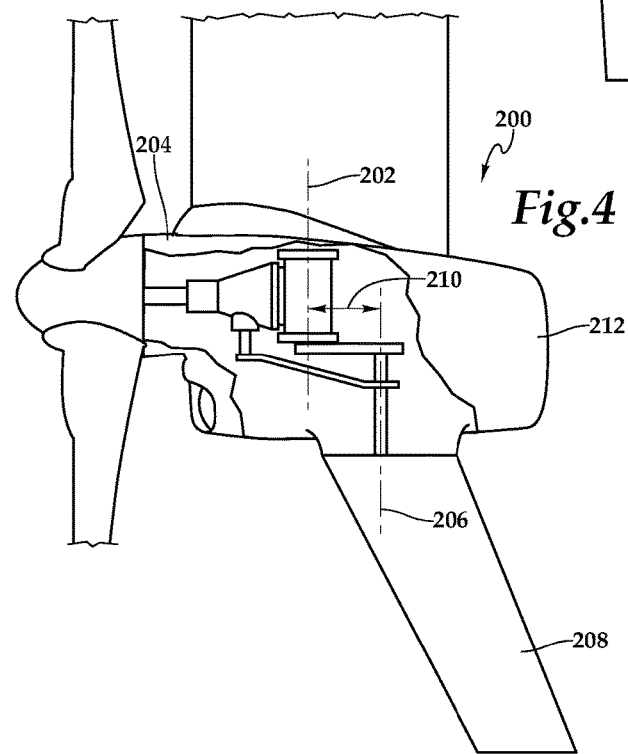

TILTROTOR AIRCRAFT HAVING ACTIVE WING EXTENSIONS

TECHNICAL FIELD OF THE DISCLOSURE

The present disclosure relates, in general, to tiltrotor aircraft having wing extensions and, in particular, to tiltrotor aircraft having active wing extensions operable to move or oscillate to dampen unstable structural modes in parts of the tiltrotor aircraft, such as the wings or nacelles.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

The wings, nacelles and other structural elements of tiltrotor aircraft are susceptible to moving or vibrating at different modes, especially as the mode of the proprotors is lowered due to increasing forward flight speed and air flow through the proprotor. These modal movements approximate a pitch-plunge, swim-like or whirling movement that can be catastrophic if structural stability margins are exceeded. While adding structural stiffness to the wings and other portions of the tiltrotor aircraft can improve stability margins during forward flight, the addition of such structural stiffness comes with the drawback of adding weight to the tiltrotor aircraft, increasing the amount of lift needed to fly the tiltrotor aircraft, thereby consuming more fuel and reducing tiltrotor aircraft endurance. Passive damping systems may fail to adequately damp modal motions, may be complicated and may lack efficiency, particularly in light of the weight penalty associated with such systems. Accordingly, a need has arisen for a tiltrotor aircraft stability system that does not add superfluous weight to the tiltrotor aircraft, while still providing adequate damping of modes of the structural elements of the tiltrotor aircraft.

SUMMARY

In a first aspect, the present disclosure is directed to a pylon assembly for a tiltrotor aircraft that includes a fixed pylon having an outboard end. A rotor assembly is rotatably coupled to the fixed pylon and is operable to rotate between a generally vertical orientation in a vertical takeoff and landing mode and a generally horizontal orientation in a forward flight mode. The rotor assembly includes a proprotor operable to produce a generally vertical slipstream in the vertical takeoff and landing mode and a generally horizontal slipstream in the forward flight mode. A wing extension having a minimal dimension is rotatably coupled to the outboard end of the fixed pylon. The wing extension is operable to rotate generally with the rotor assembly such that the minimal dimension of the wing extension remains in the slipstream of the proprotor.

In some embodiments, the pylon assembly may include a linkage arm at least partially disposed in the fixed pylon, the linkage arm transferring a rotational force of the rotor assembly to the wing extension. In such embodiments, the linkage arm may include a first end and a second end, the first end of the linkage arm coupled to the rotor assembly, the second end of the linkage arm coupled to the wing extension. The rotor assembly may include a mast such that the first end of the linkage arm may be coupled to the mast. In certain embodiments, the pylon assembly may include a wing extension shaft at least partially extending through the fixed pylon such that the second end of the linkage arm may be coupled to the wing extension shaft. In such embodiments, the wing extension shaft may have an outboard end fixedly coupled to a quarter chord point of the wing extension and/or an inboard end rotatably coupled to an anchoring component, such as a gearbox, at least partially located in the fixed pylon.

In some embodiments, the pylon assembly may include an actuator operable to rotate the wing extension. In certain embodiments, the fixed pylon may include a nacelle such as a nacelle including an engine and at least one gearbox. In some embodiments, the axes of rotation of the rotor assembly and the wing extension may be substantially coaxial or non-coaxial. In certain embodiments, the rotor assembly and the wing extension may form either substantially congruent or different pitch angles relative to the fixed pylon while rotating through a range of motion. In some embodiments, the rotor assembly and the wing extension may be rotatable, in synchrony, between the generally vertical orientation in the vertical takeoff and landing mode and the generally horizontal orientation in the forward flight mode.

In a second aspect, the present disclosure is directed to a tiltrotor aircraft including a fuselage supporting first and second wings each having an outboard end. First and second pylon assemblies are positioned, respectively, proximate the outboard ends of the first and second wings. Each of the pylon assemblies includes a fixed pylon having an outboard end. A rotor assembly is rotatably coupled to each fixed pylon and is operable to rotate between a generally vertical orientation in a vertical takeoff and landing mode and a generally horizontal orientation in a forward flight mode. Each rotor assembly includes a proprotor operable to produce a generally vertical slipstream in the vertical takeoff and landing mode and a generally horizontal slipstream in the forward flight mode. A wing extension having a minimal dimension is rotatably coupled to the outboard end of each fixed pylon. The wing extensions are operable to rotate generally with the rotor assemblies such that the minimal dimensions of the wing extensions remain in the slipstream of the proprotors.

In some embodiments, each of the pylon assemblies may include a linkage arm at least partially disposed in the fixed pylon that transfers a rotational force of a rotor assembly to a wing extension. In certain embodiments, each of the pylon assemblies may include an actuator operable to rotate a wing extension. In other embodiments, for each pylon assembly, axes of rotation of the rotor assembly and the wing extension may be substantially coaxial. In some embodiments, for each pylon assembly, the rotor assembly and the wing extension may be rotatable, in synchrony, between the generally vertical orientation in the vertical takeoff and landing mode and the generally horizontal orientation in the forward flight mode.

In a third aspect, the present disclosure is directed to a stabilization system for a tiltrotor aircraft that includes a wing having an outboard end and a wing extension rotatably coupled to the outboard end of the wing. An actuator is coupled to the wing extension and is operable to move the wing extension to dampen a mode of the wing, thereby stabilizing the tiltrotor aircraft.

In some embodiments, the stabilization system may include a feedback loop computing unit in communication with the actuator that is operable to control movement of the wing extension. In such embodiments, sensors coupled to the wing and in data communication with the feedback loop computing unit may be operable to detect at least one stabilization parameter of the wing. In certain embodiments, the feedback loop computing unit may be operable to determine a frequency and a phase angle of the mode of the wing based on the at least one stabilization parameter. In such embodiments, the feedback loop computing unit may be operable to send a command to oscillate the wing extension at a dampening frequency having substantially the same frequency of the mode of the wing and having a different phase angle of the mode of the wing.

In some embodiments, the wing extension may have oscillatory authority in a range of approximately 5 degrees to approximately −5 degrees. In certain embodiments, the mode of the wing may have a frequency and a phase angle, and the actuator may be operable to oscillate the wing extension at a dampening frequency having substantially the same frequency of the mode of the wing and having a different phase angle of the mode of the wing such that the wing experiences a dampening effect. In such embodiments, the dampening frequency may be in a range of approximately 0.5 Hertz to approximately 10 Hertz.

In a fourth aspect, the present disclosure is directed to a tiltrotor aircraft that includes a fuselage supporting first and second wings each having an outboard end. First and second nacelles are respectively coupled to the outboard ends of the first and second wings. The first and second nacelles each have an outboard end. First and second wing extensions are rotatably coupled, respectively, to the outboard ends of the first and second nacelles. First and second actuators are operable to respectively move the first and second wing extensions to dampen a mode of the first and second wings, thereby stabilizing the tiltrotor aircraft.

In some embodiments, the tiltrotor aircraft may include a feedback control system including a feedback loop computing unit and at least one sensor, the feedback control system operable to detect a frequency of the mode and oscillate the first and second wing extensions, via the first and second actuators, at the frequency. In certain embodiments, the first and second wing extensions may have oscillatory authority in a range of approximately 5 degrees to approximately −5 degrees. In other embodiments, the mode has a frequency and a phase angle, and the first and second actuators may be operable to oscillate the first and second wing extensions at a dampening frequency having substantially the same frequency of the mode and having a different phase angle of the mode such that the first and second wings experience a dampening effect. In such embodiments, the dampening frequency may be in a range of approximately 0.5 Hertz to approximately 10 Hertz. In some embodiments, each of the first and second nacelles may include a fixed pylon and a rotor assembly operable to rotate relative to the fixed pylon. In other embodiments, each of the first and second nacelles may be rotatable relative to the first and second wings.

In a fifth aspect, the present disclosure is directed to a method for stabilizing a tiltrotor aircraft. The method includes receiving at least one stability parameter from at least one sensor operably associated with a wing of the tiltrotor aircraft; determining a frequency and a phase angle of a mode of the wing based on the at least one stability parameter; and moving wing extensions at a dampening frequency to stabilize the tiltrotor aircraft; wherein the dampening frequency is substantially equal to the frequency of the mode of the wing and the dampening frequency has a different phase angle of the mode of the wing.

The method may also include moving the wing extensions with actuators; moving the wing extensions responsive to commands from a feedback loop computing unit; moving the wing extension with approximately 5 degrees to approximately −5 degrees of oscillatory authority and/or oscillating the wing extensions at a frequency in a range of approximately 0.5 Hertz to approximately 10 Hertz.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which:

FIG. 3 is a top view of a pylon assembly having a rotatable wing extension for a tiltrotor aircraft in accordance with embodiments of the present disclosure;

FIG. 4 is a top view of a pylon assembly having a rotatable wing extension for a tiltrotor aircraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
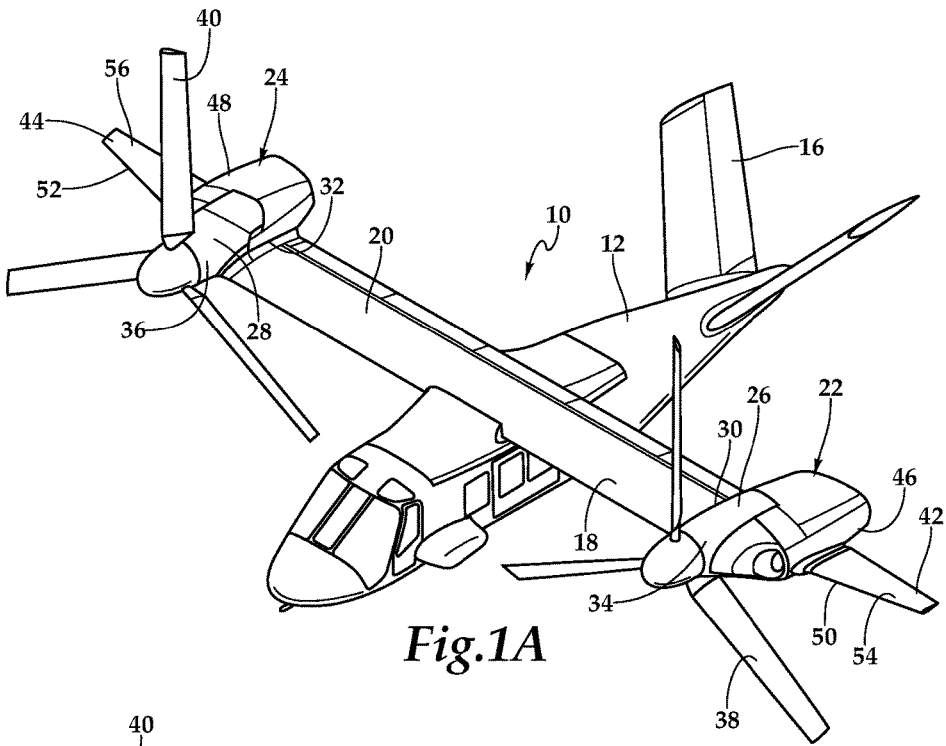
FIGS. 1A-1B are schematic illustrations of a tiltrotor aircraft utilizing wing extensions in accordance with embodiments of the present disclosure.
Figure 1B:
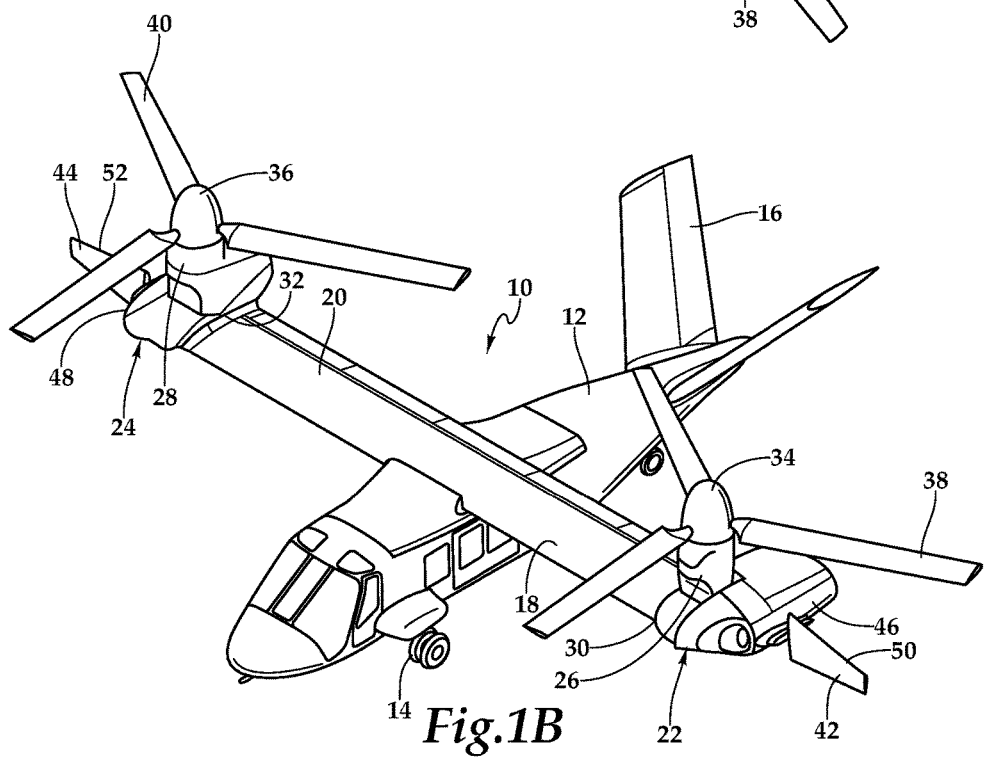

Referring to FIGS. 1A and 1B in the drawings, a tiltrotor aircraft is schematically illustrated and generally designated 10. Tiltrotor aircraft 10 includes a fuselage 12, landing gear 14, tail member 16, wings 18, 20 and fixed pylons 22, 24. Wings 18, 20 are supported by fuselage 12. Fixed pylons 22, 24 are fixedly attached in a generally horizontal orientation to outboard ends 30, 32 of wings 18, 20 and non-rotatable relative to fuselage 12 and wings 18, 20, respectively. Rotatably mounted within fixed pylons 22, 24 are rotor assemblies 26, 28, which respectively include proprotors 34, 36 each including a plurality of proprotor blade assemblies 38, 40, respectively. As used herein, the term "coupled" may include direct or indirect coupling by any means, including moving and non-moving mechanical connections. The position of rotor assemblies 26, 28 and the pitch of proprotor blade assemblies 38, 40 are determined using a flight control system to selectively control the direction, thrust and lift of tiltrotor aircraft 10. FIG. 1A illustrates tiltrotor aircraft 10 in airplane mode, in which proprotors 34, 36 are positioned to rotate in a substantially vertical plane to provide a forward thrust while a lifting force is supplied by wings 18, 20 such that tiltrotor aircraft 10 flies much like a conventional propeller driven aircraft. FIG. 1B illustrates tiltrotor aircraft 10 in helicopter mode, in which proprotors 34, 36 are positioned to rotate in a substantially horizontal plane to provide a lifting thrust such that tiltrotor aircraft 10 flies much like a conventional helicopter. In helicopter mode, tiltrotor aircraft 10 may perform vertical takeoff and landing operations. It should be appreciated that tiltrotor aircraft 10 can be operated such that proprotors 34, 36 are selectively positioned between airplane mode and helicopter mode, which can be referred to as a conversion mode.

In some embodiments, fuselage 12 may include an engine, transmission and/or gearbox (not shown) that provide torque and rotational energy to proprotors 34, 36 via one or more drive shafts located in wings 18, 20. In these embodiments, fixed pylons 22, 24 need not include an engine and/or transmission. In other embodiments, each fixed pylon 22, 24 may be a nacelle that includes respective engines, transmissions and/or gearboxes to provide torque and rotational energy to the proprotors 34, 36. In yet other embodiments, tiltrotor aircraft 10 may include engines, transmissions and/or gearboxes in both fuselage 12 and fixed pylons 22, 24 that drive proprotors 34, 36. In such a distributed drive system, the engine, transmission and/or gearbox located in fuselage 12 may serve as a backup drive system in the event of failure of either or both of the engines in fixed pylons 22, 24.

Wing extensions 42, 44 are rotatably coupled to outboard ends 46, 48 of fixed pylons 22, 24, respectively. The addition of wing extensions 42, 44 increase the wingspan and aspect ratio of tiltrotor aircraft 10, thereby increasing the efficiency of tiltrotor aircraft 10 in forward flight, including the capability to fly at a higher altitude for longer ranges with the same fuel load. While spinning, proprotors 34, 36 generate rotorwash, which causes download forces on conventional wing extensions. Such download forces can oppose the lift or thrust generated by proprotors 34, 36, thereby lessening the efficiency of proprotors 34, 36. In the present disclosure, wing extensions 42, 44 may be rotated, or articulated, into a plurality of streamlined positions relative to the airflow generated by proprotors 34, 36, thereby reducing the download forces. In the illustrated embodiment, rotor assemblies 26, 28 and wing extensions 42, 44 are rotatable, in synchrony, between a generally horizontal orientation in forward flight mode, as shown in FIG. 1A, and a generally vertical orientation in vertical takeoff and landing mode, as shown in FIG. 1B. Proprotors 34, 36 produce a generally horizontal slipstream in forward flight mode and a generally vertical slipstream in vertical takeoff and landing mode. By rotating wing extensions 42, 44 as illustrated in FIGS. 1A and 1B, minimal dimensions 50, 52, as opposed to top and broad surfaces 54, 56, of wing extensions 42, 44 remain in the slipstreams of proprotors 34, 36 in all operational modes, thereby minimizing the download forces on wing extensions 42, 44. In the illustrated embodiment, minimal dimensions 50, 52 are the forward edges of wing extensions 42, 44.

Although wing extensions 42, 44 have been illustrated in the context of tiltrotor aircraft 10, it will be understood by those skilled in the art that wing extensions 42, 44 can be implemented in a variety of ways on a variety of aircraft including, for example, tiltwing aircraft, quad tiltrotor aircraft, unmanned aircraft, airplanes and the like. As such, those skilled in the art will recognize that wing extensions 42, 44 can be integrated into a variety of aircraft configurations. It is noted that the operation of fixed pylon 22, rotor assembly 26 and wing extension 42 is substantially symmetric to the operation of fixed pylon 24, rotor assembly 28 and wing extension 44. Therefore, for the sake of efficiency certain features will be disclosed only with regard to fixed pylon 22, rotor assembly 26 and wing extension 42. However, one of ordinary skill in the art will fully appreciate an understanding of fixed pylon 24, rotor assembly 28 and wing extension 44 based upon the disclosure herein of fixed pylon 22, rotor assembly 26 and wing extension 42.

Figure 2A:
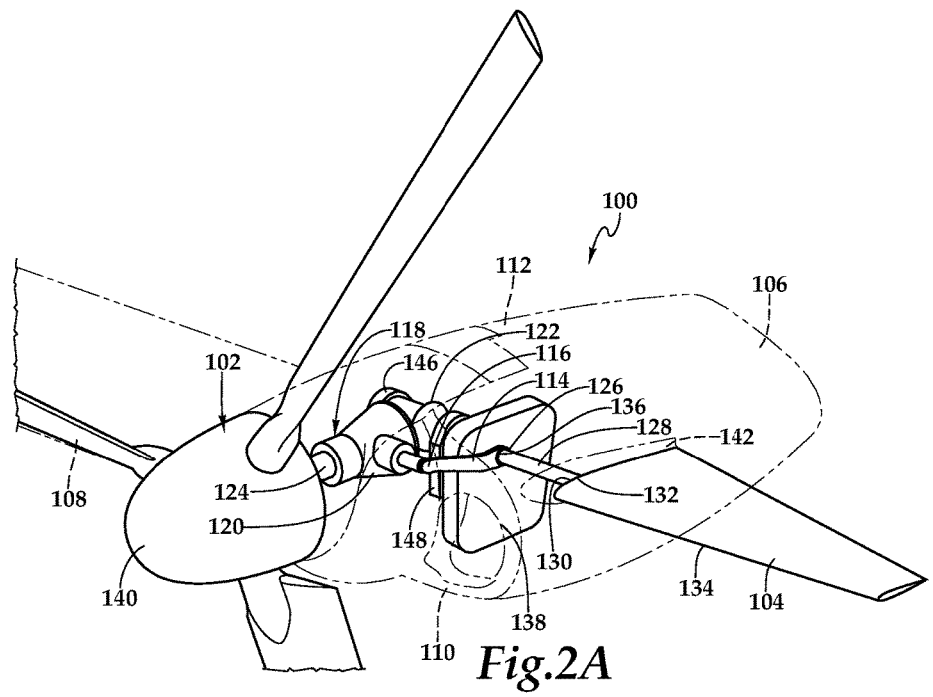
FIGS. 2A-2E are isometric views of a pylon assembly having a rotatable wing extension for a tiltrotor aircraft in accordance with embodiments of the present disclosure.
Figure 2B:
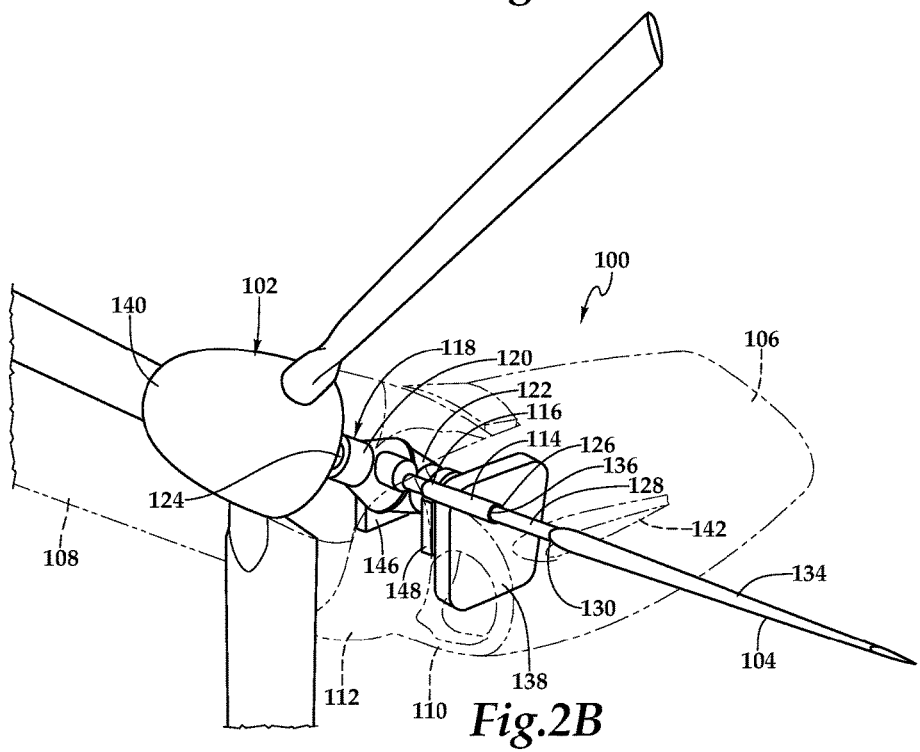
Figure 2C:
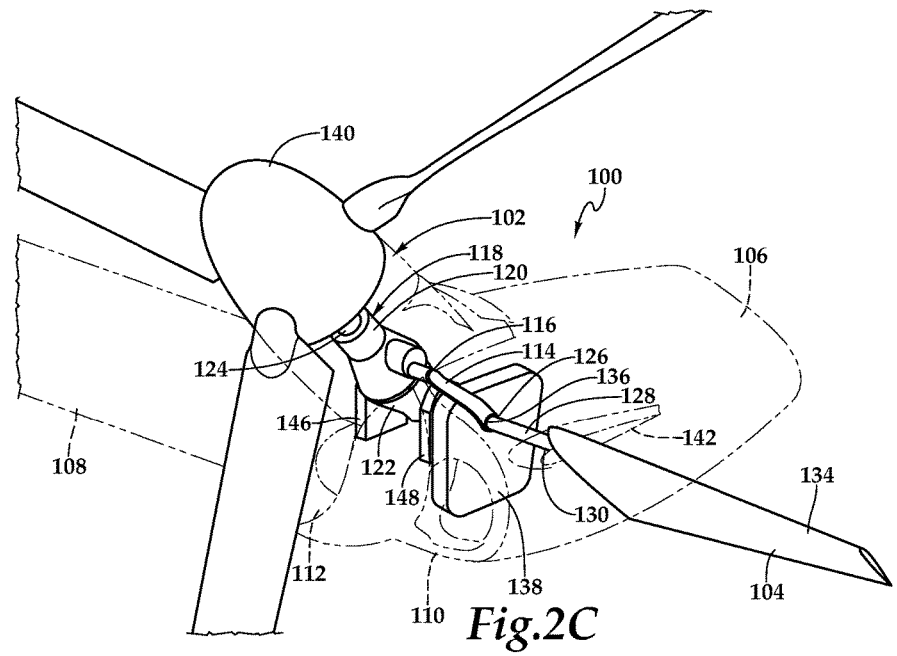
Figure 2D:
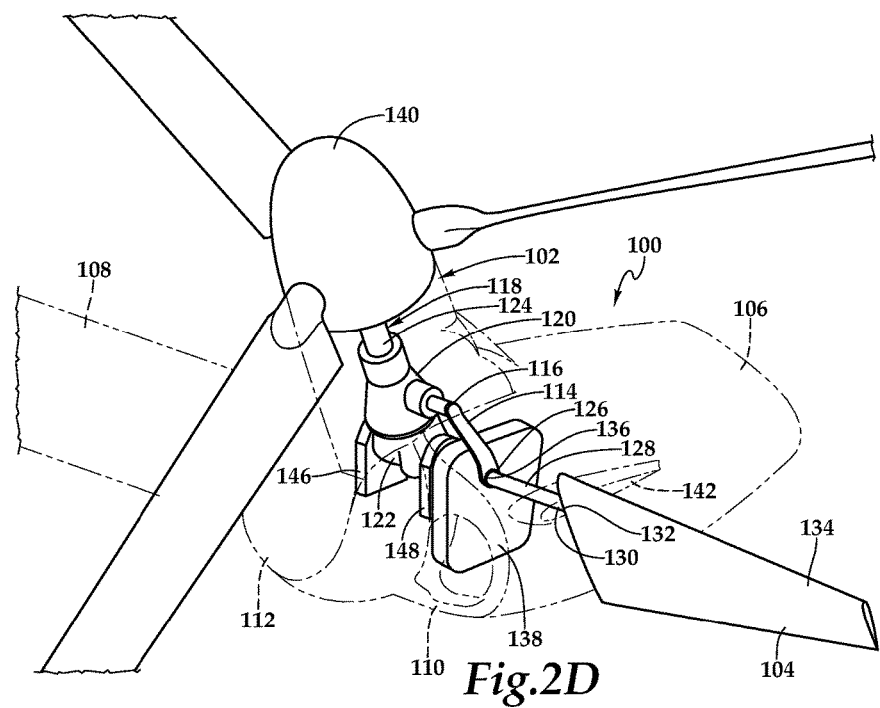
Figure 2E:
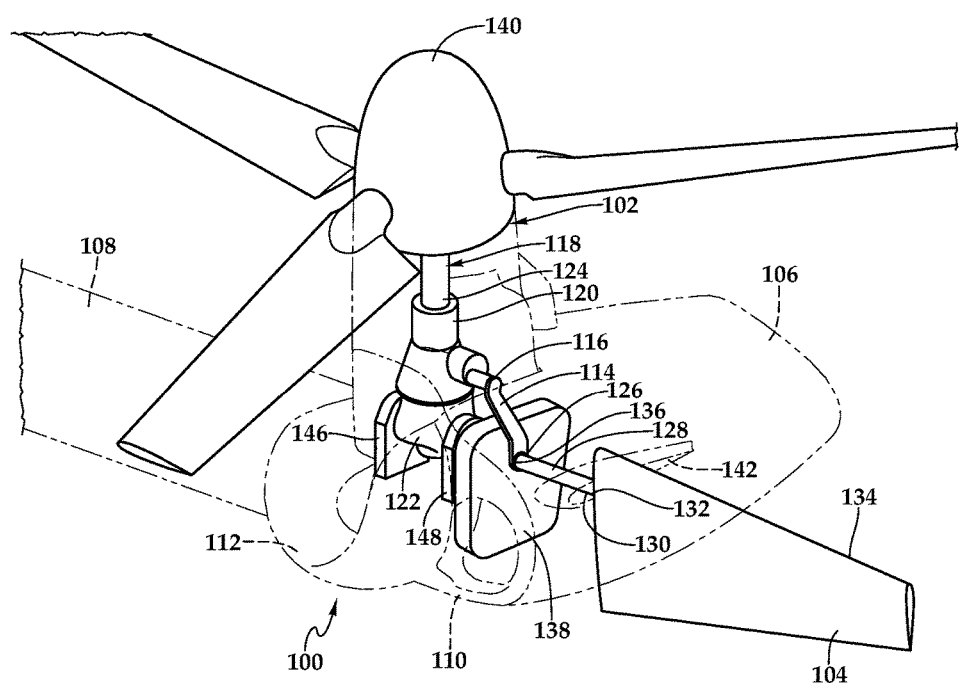
Figure 5:
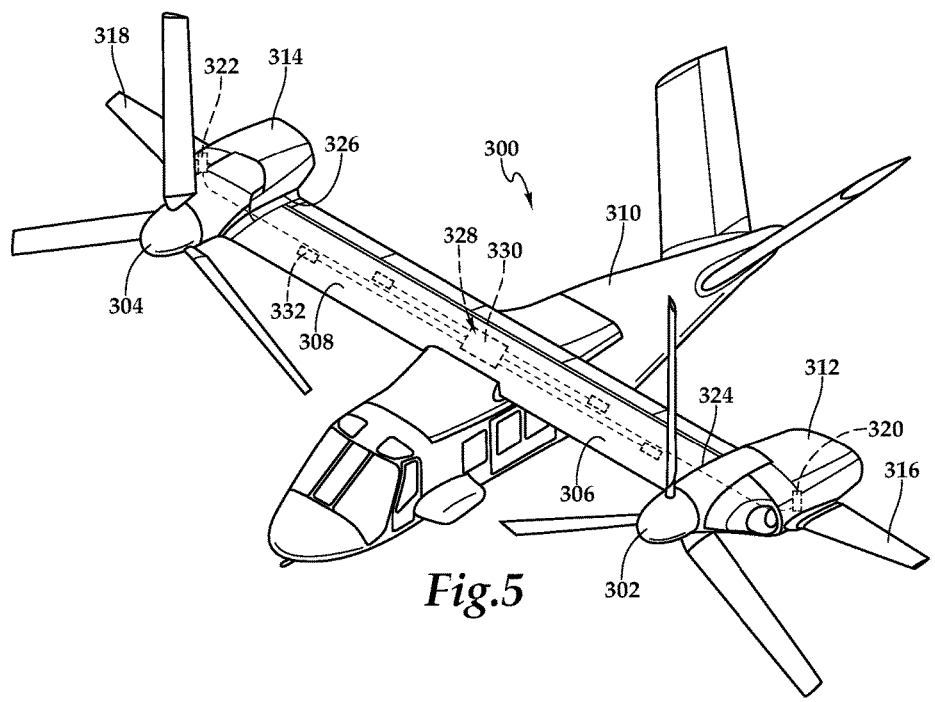
FIG. 5 is a schematic illustration of a tiltrotor aircraft having active wing extensions operable to dampen a mode of one or more portions of the tiltrotor aircraft in accordance with embodiments of the present disclosure.

Referring to FIGS. 2A-E and 3 in the drawings, a pylon assembly for a tiltrotor aircraft is schematically illustrated and generally designated 100. As shown in FIGS. 2A-2E, rotor assembly 102 and wing extension 104 form substantially congruent and in-phase pitch angles relative to fixed pylon 106 and wing 108 while rotating through a range of motion between a generally horizontal orientation for forward flight mode, as shown in FIG. 2A and a generally vertical orientation in vertical takeoff and landing mode, as shown in FIG. 2E. FIGS. 2A-2E show rotor assembly 102 and wing extension 104 forming 0°, 30°, 50°, 70° and 90° pitch angles, respectively, relative to fixed pylon 106 and wing 108. Fixed pylon 106 includes an outboard portion 110 interposed between rotor assembly 102 and wing extension 104. As illustrated, wing extension 104 is coupled to rotor assembly 102 via outboard portion 110 of fixed pylon 106. Rotor assembly 102 is rotatably coupled to an inboard portion 112 of fixed pylon 106.

Wing extension 104 responds to the rotational motion of rotor assembly 102 by utilizing a linkage arm 114. Linkage arm 114, which is at least partially disposed in fixed pylon 106, transfers a rotational force of rotor assembly 102 to wing extension 104. A first end 116 of linkage arm 114 is coupled to a mast 118 of rotor assembly 102. In the illustrated embodiment, mast 118 includes a proprotor gearbox 120, a spindle gearbox 122 and shaft 124 that is coupled to proprotor 140. A second end 126 of linkage arm 114 is coupled to wing extension 104 via a wing extension shaft 128, which extends through outboard portion 110 of fixed pylon 106. Wing extension shaft 128 transfers rotational energy from linkage arm 114 to wing extension 104 and provides structural support for wing extension 104 as wing extension 104 rotates through its range of motion. Wing extension shaft 128 is lateral to the direction of forward flight of the tiltrotor aircraft. An outboard end 130 of wing extension shaft 128 is fixedly coupled to wing extension 104. In the illustrated embodiment, outboard end 130 of wing extension shaft 128 is fixedly coupled at the quarter chord point 132 nearer forward edge 134 of wing extension 104, although wing extension shaft 128 may be coupled at any chordwise point along wing extension 104.

An inboard end 136 of wing extension shaft 128 is rotatably coupled to anchoring component 138, which is at least partially located in fixed pylon 106. Anchoring component 138 may be any fixed component in pylon assembly 100 from which wing extension 104 may obtain structural support and be rotatable thereto. In some embodiments, anchoring component 138 may be a fixed gearbox that transfers rotational energy from one or more engines to proprotor 140. By rotating rotor assembly 102 and wing extension 104 in the illustrated manner whereby the forward edge and minimal dimension 134 of wing extension 104 remains in the slipstream of proprotor 140 in all operational modes, download forces experienced by wing extension 104 due to rotorwash from proprotor 140 are minimized.

Wing extension shaft 128 may be solid or hollow. In embodiments in which wing extension shaft 128 is a hollow tube, the inner lumen of the tube may include a shaft that provides structural support for wing extension 104, while the surrounding tube is rotatable about the inner shaft to transfer rotational energy to wing extension 104. Outboard portion 110 of fixed pylon 106 also includes a wing extension stub 142 that provides a clean and smooth transition from which wing extension 104 may rotate. Wing extension 104 may have any shape suitable for the operational needs, including a cambered, symmetric, airfoil, straight-edged, rounded and/or elliptical shape, to name a few examples. Wing extension 104 may also taper spanwise at any rate, and may be any thickness depending on the application. In some implementations, wing extension 104 may be an assembly of several different components and/or layers. Also, while linkage arm 114 is shown to have an angled shape, linkage arm 114 may be any shape, including a straight, curved or irregular shape, to name a few examples. In other embodiments, wing extension 104 may be rotated using an actuator (an example of which is shown and discussed further below) that is either in addition to, or in lieu of, linkage arm 114. The actuator may rotate wing extension 104 between the vertical and horizontal orientations to minimize download forces on wing extension 104. In these embodiments, the actuator may be used to actively control wing extension 104 so that wing extension 104 may be a control surface operable to create moments about various axes of the tiltrotor aircraft.

Referring specifically to FIG. 3 in the drawings, the axes of rotation of both rotor assembly 102 and wing extension 104 are substantially coaxial by virtue of rotating about axis 144. In particular, spindle gearbox 122, which is rotatably coupled to pillow blocks 146, 148, is rotatable about axis 144. Wing extension shaft 128 also lies along axis 144 such that wing extension 104 rotates about axis 144. In other embodiments, wing extension shaft 128 may traverse anchoring component 138 and extend into rotor assembly 102 becoming the shaft of rotation for both rotor assembly 102 and wing extension 104. In this embodiment, rotation of rotor assembly 102 by means of rotational energy transferred from an engine causes wing extension shaft 128 to rotate wing extension 104 in like manner, thereby eliminating the need for linkage arm 114.

Referring to FIG. 4 in the drawings, a pylon assembly is schematically illustrated and generally designated 200. In the illustrated embodiment, axis of rotation 202 of rotor assembly 204 is offset, and therefore non-coaxial with, axis of rotation 206 of wing extension 208. By varying axes 202, 206 from one another, the pitch angles of rotor assembly 204 and wing extension 208 may be out-of-phase from one another as they rotate between the vertical and horizontal orientations. For example, instead of having equal pitch angles relative to the fixed pylon, as shown in FIGS. 2A-E and 3, rotor assembly 204 and wing extension 208 may be offset 10° from one another as they rotate between the vertical and horizontal orientations. Indeed, various offset distances 210 between axes 202, 206 may be used to vary the degree to which the pitch angles of rotor assembly 204 and wing extension 208 are offset from one another. In some embodiments, wing extension 208 may be tailored to rotate at a different rate than rotor assembly 204, if desired. While the illustrated embodiment shows axis of rotation 206 of wing extension 208 to be aft of axis of rotation 202 of rotor assembly 204, in other embodiments axis of rotation 206 may be forward of axis of rotation 202. Wing extension 208 is located further aft of fixed pylon 212 than that which was shown for wing extension 104 in FIG. 3 to illustrate that the wing extension may protrude from any portion of the fixed pylon. Indeed, wing extension 208 may be offset from rotor assembly 204 by any distance. Wing extension 208 is also swept backwards. In other embodiments, wing extension 208 may be swept forward, anhedral or dihedral.

Referring to FIGS. 5, 6 and 7A-7C in the drawings, a tiltrotor aircraft in forward flight mode having a stabilization system is schematically illustrated and generally designated 300. As the forward flight speed of tiltrotor aircraft 300 increases, more air passes through proprotors 302, 304 and the mode of proprotors 302, 304 is lowered. Components in tiltrotor aircraft 300, including wings 306, 308, fuselage 310 and/or fixed pylons 312, 314, are susceptible to interacting, or vibrationally coupling, with the mode of proprotors 302, 304 so as to cause a structural mode of vibration in these components. Such a structural mode of vibration may include pitch-plunge, swim-like and/or whirling motions that can lead to the instability of tiltrotor aircraft 300 as forward flight speed increases. In the illustrated embodiment, wings extensions 316, 318 may be oscillated, or driven, opposite of this undesirable structural mode of instability to counteract, or reduce, such motion, thereby increasing the stability of tiltrotor aircraft 300 in forward flight.

Movement of each wing extension 316, 318 may be provided by actuators 320, 322. In the illustrated embodiment, wing extensions 316, 318 are rotatably coupled to fixed pylons 312, 314. It should be understood by those having ordinary skill in the art that, unlike wing extensions 42, 44 described herein, wing extensions 316, 318 could alternatively be rotatably coupled to nacelles that are rotatably mounted near the ends of wings 306, 308 to increase the stability of such tiltrotor aircraft in forward flight. Returning to the present embodiment, each fixed pylon 312, 314 is interposed between a wing extension 316, 318 and an outboard end 324, 326 of wings 306, 308, respectively. Tiltrotor aircraft 300 includes feedback control system 328, which includes a feedback loop computing unit 330 and one or more sensors 332 located in wings 306, 308. Sensors 332 may include strain gauges, accelerometers or other sensor types useful in detecting a mode of the structural elements of tiltrotor aircraft 300.

In some embodiments, feedback control system 328 may detect a frequency of the mode of wings 306, 308 and oscillate wing extensions 316, 318, via actuators 320, 322, at the detected frequency. Specifically, feedback control system 328 may oscillate wing extensions 316, 318 at a different phase angle or opposite the mode of wings 306, 308 to dampen the mode of wings 306, 308, thereby stabilizing tiltrotor aircraft 300. Feedback loop computing unit 330 may be in electrical or hydraulic communication with actuators 320, 322 and be operable to control the movement of wing extensions 316, 318 via actuators 320, 322. Sensors 332 may be in data communication with feedback loop computing unit 330 and be operable to detect one or more stability parameters of wings 306, 308. Feedback loop computing unit 330 may receive the one or more stability parameters from sensors 332. Non-limiting examples of stability parameters include torsion, frequency of vibration, acceleration, structural strain and structural bending, to name a few examples. Such stability parameters are used to determine a mode of wings 306, 308. In other embodiments, sensors 332 may be located in any portion of tiltrotor aircraft 300, including fixed pylons 312, 314 and/or fuselage 310 so as to detect stability parameters in those elements as well.

Feedback loop computing unit 330 may determine a frequency and a phase angle of the mode of wings 306, 308 based on the stability parameters. Feedback loop computing unit 330 may then send one or more commands to move, or oscillate, wing extensions 316, 318 at a dampening frequency to stabilize tiltrotor aircraft 300. The dampening frequency may be substantially equal to the frequency of the mode of wings 306, 308, and different from the phase angle of the mode of wings 306, 308. This opposite, or counteracting, motion lessens the modal vibrations in wings 306, 308. In some implementations, the dampening frequency at which wing extensions 316, 318 are oscillated may be in a range of approximately 0.5-10 Hz, which in some cases may be the same or similar to the structural mode of vibration of wings 306, 308. By way of specific example for purposes of illustration only, sensors 332 may detect torsion in wings 306, 308, causing feedback loop computing unit 330 to calculate a 4.2 Hz mode in wings 306, 308. Feedback loop computing unit 330 may then command actuators 320, 322 to drive wing extensions 316, 318 at 4.2 Hz, but in a different phase angle than wings 306, 308, to counteract the torsion forces in wings 306, 308. In embodiments in which sensors 332 are distributed at other portions of tiltrotor aircraft 300, such as fixed pylons 312, 314 and/or fuselage 310, feedback loop computing unit 330 may drive wing extensions 316, 318 to cancel modes in any of these structural elements as well.

Using the illustrative embodiments, in forward flight mode sufficient air moves over wing extensions 316, 318 to generate significant forces at the wingtips. Properly phased, the force generated by wing extensions 316, 318 counteracts the force generated by proprotors 302, 304, which drives loads and vibrations. Oscillating wing extensions 316, 318 may be used to suppress wing motion, effectively adding damping to the wing modes, a primary driver of tiltrotor aircraft stability. For example, oscillating wing extensions of the present disclosure may add 8 to 10% damping or more, although results may vary based on the exact configuration of the wing extension implementation. In addition, the oscillating wing extensions of the present disclosure are not as complicated and do not impose the weight penalty associated with passive damping systems.

Figure 6:
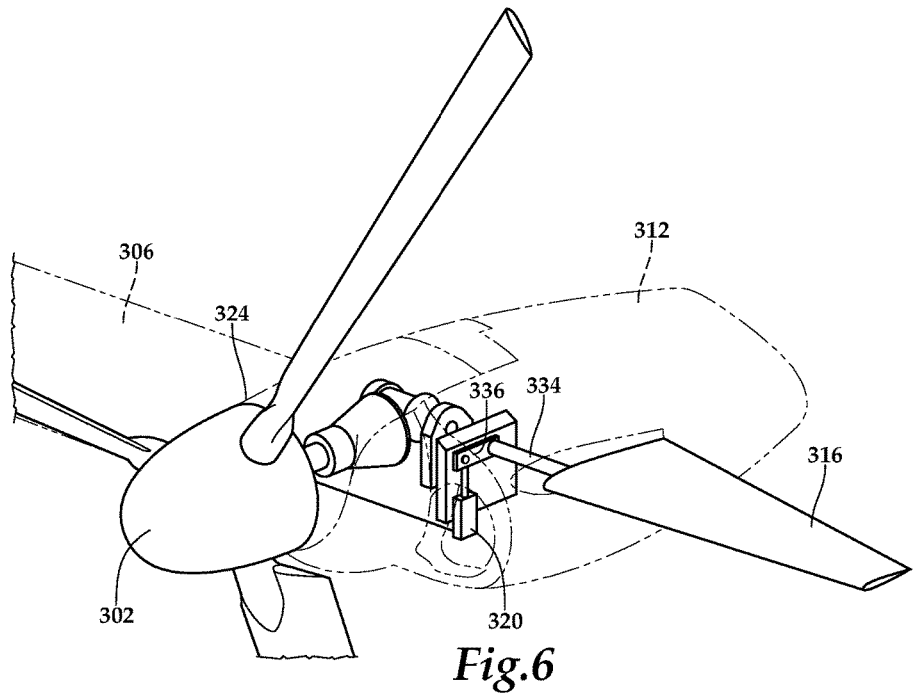
FIG. 6 is an isometric view of a pylon assembly having an active wing extension for a tiltrotor aircraft in accordance with embodiments of the present disclosure.
Figure 7A:
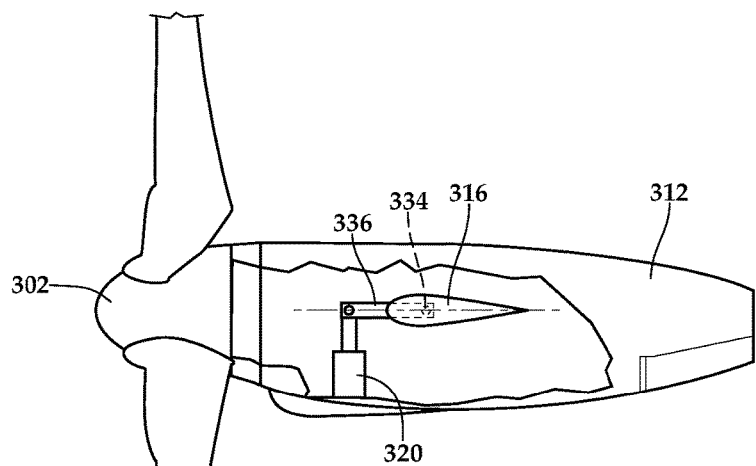
FIGS. 7A-7C are side views of a pylon assembly having an active wing extension at various pitch angles in accordance with embodiments of the present disclosure.
Figure 7B:
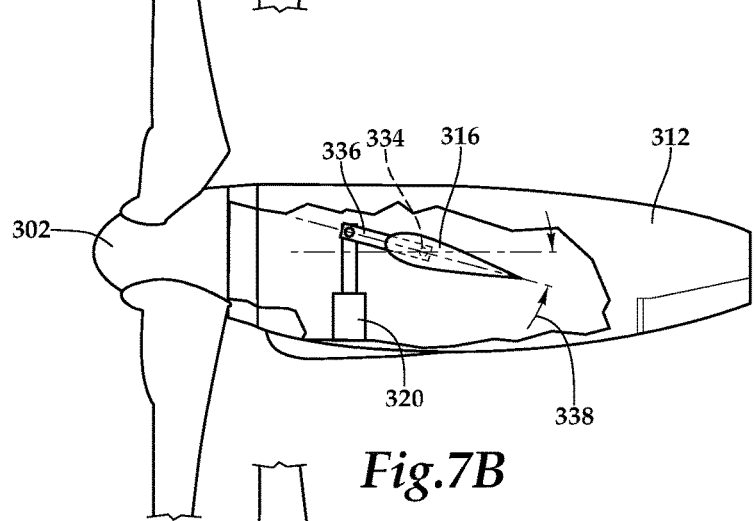
Figure 7C:
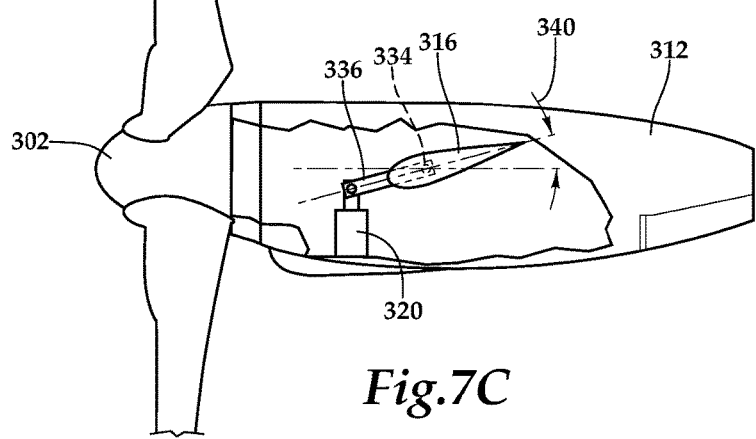

As best shown in FIG. 6, actuator 320 is coupled to a wing extension shaft 334 via a cantilevered arm 336 so that the linear motion of actuator 320 enables rotary motion for wing extension 316. Thus, wing extension 316 may be oscillated responsive to rotation about wing extension shaft 334. Actuator 320 may be a hydraulic, electric, pneumatic or mechanical actuator. While actuator 320 is shown to extend and retract in the vertical direction, in other embodiments cantilevered arm 336 may extend upward or downward instead of forward, and actuator 320 may be rotated 90 degrees to extend and retract in the horizontal direction. Depending on the physical dimensions and available space inside fixed pylon 312, such an alternative arrangement may provide actuator 320, and therefore wing extension 316, with a wider range of motion. As best shown in FIGS. 7A-C, a pitch angle range of motion of wing extension 316 is shown. In one non-limiting example, wing extension 316 has approximately 5 degrees (see angle 338 in FIG. 7B) to approximately −5 degrees (see angle 340 in FIG. 7C) oscillatory authority, thereby allowing feedback loop computing unit 330 to oscillate wing extension 316 within a pitch angle range of motion of approximately 10 degrees. Even though the present example depicted and described a particular oscillatory authority for the wing extensions of the present disclosure, it should be understood by those having ordinary skill in the art that wing extensions having oscillatory authority both greater than and less than that depicted and described are possible and are considered to be within the scope of the present disclosure.

In some embodiments, wing extensions 316, 318 may oscillate between anhedral and dihedral positions at any frequency to cancel or reduce a mode of a structural portion of tiltrotor aircraft 300, thereby providing another dimension by which to dampen a mode of tiltrotor aircraft 300. In yet other embodiments, sensors 332 may provide stability, load and vibrational measurements to feedback loop computing unit 330, which may signal actuators 320, 322 to move wing extension 316, 318 to cancel out such instability, loads or vibrations. For example, in the event that high download forces are detected by sensors 332, feedback loop computing unit 330 or the pilot may command actuators 320, 322 to rotate wing extensions 316, 318 synchronously with the rotor assemblies such that wing extensions 316, 318 and the rotor assemblies form the same or similar pitch angles relative to fixed pylons 312, 314, analogously to FIGS. 2A-E above. In such embodiments, actuators 320, 322 may be a two-stroke actuator system, one with a low bandwidth and one with a high-bandwidth, to enable movement of wing extensions 316, 318 into a vertical orientation, such as when tiltrotor aircraft 300 is in helicopter mode. In other embodiments, a linkage arm, such as linkage arm 114 in FIGS. 2A-E and 3, may be used in addition to actuators 320, 322, thereby enabling wing extensions 316, 318 to both reduce download forces thereon and to counteract modes in tiltrotor aircraft 300. Wing extensions 316, 318 may also be actively movable, via actuators 320, 322, to increase the efficiency of vertical and roll damping during forward flight. While wing extensions 316, 318 are shown in relation to tiltrotor aircraft 300, wing extensions 316, 318 may also be utilized on jet aircraft or compound helicopters.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion and stabilization system for a tiltrotor aircraft comprising:
   a wing having an outboard end;
   a fixed pylon coupled to the outboard end of the wing, the fixed pylon including a rotor assembly rotatably coupled to an inboard portion of the fixed pylon;
   a wing extension rotatably coupled to an outboard end of the fixed pylon such that an outboard portion of the fixed pylon is interposed between the rotor assembly and the wing extension;
   an actuator coupled to the wing extension, the actuator operable to move the wing extension to dampen a mode of the wing;
   a feedback loop computing unit in communication with the actuator, the feedback loop computing unit operable to control movement of the wing extension by the actuator; and
   at least one sensor coupled to the wing and in data communication with the feedback loop computing unit, the at least one sensor operable to detect at least one stabilization parameter of the wing;
   wherein the feedback loop computing unit is operable to determine a frequency of the mode of the wing based on the at least one stabilization parameter from the at least one sensor on the wing to form a detected frequency value;
   wherein the feedback loop computing unit is operable to calculate a dampening frequency equal to the detected frequency value; and
   wherein the feedback loop computing unit is operable to send a command including the dampening frequency to the actuator to oscillate the wing extension at the dampening frequency, thereby stabilizing the tiltrotor aircraft.

2. The propulsion and stabilization system as recited in claim 1 wherein the feedback loop computing unit is operable to determine a phase angle of the mode of the wing based on the at least one stabilization parameter.

3. The propulsion and stabilization system as recited in claim 2 wherein the feedback loop computing unit is operable to send the command to oscillate the wing extension at a different phase angle than the phase angle of the mode of the wing.

4. The propulsion and stabilization system as recited in claim 1 wherein the wing extension has oscillatory authority in a range of approximately 5 degrees to approximately −5 degrees.

5. The propulsion and stabilization system as recited in claim 1 wherein the dampening frequency is in a range of approximately 0.5 Hertz to approximately 10 Hertz.

6. The propulsion and stabilization system as recited in claim 1 wherein the wing extension is operable at a peak amplitude at greater than one frequency.

7. The propulsion and stabilization system as recited in claim 1 wherein the wing extension is oscillated using a springless actuation subsystem including the actuator.

8. The propulsion and stabilization system as recited in claim 1 wherein the outboard portion of the fixed pylon further comprises an engine, the engine interposed between the rotor assembly and the wing extension.

9. A tiltrotor aircraft comprising:
   a fuselage;
   first and second wings supported by the fuselage, the first and second wings each having an outboard end;
   first and second fixed pylons coupled, respectively, to the outboard ends of the first and second wings, the first and second fixed pylons including first and second inboard rotor assemblies, respectively;
   first and second wing extensions rotatably coupled, respectively, to outboard ends of the first and second fixed pylons such that an outboard portion of the first fixed pylon is interposed between the first rotor assembly and the first wing extension and an outboard portion of the second fixed pylon is interposed between the second rotor assembly and the second wing extension;
   first and second actuators operable to move a respective one of the first and second wing extensions to dampen a mode of the wings;
   a feedback loop computing unit in communication with the first and second actuators, the feedback loop computing unit operable to control movement of the first and second wing extensions by the first and second actuators; and
   at least one sensor coupled to the wings and in data communication with the feedback loop computing unit, the at least one sensor operable to detect at least one stabilization parameter of the wings;
   wherein the feedback loop computing unit is operable to determine a frequency of the mode of the wings based on the at least one stabilization parameter from the at least one sensor on the wings to form a detected frequency value;
   wherein the feedback loop computing unit is operable to calculate a dampening frequency equal to the detected frequency value; and
   wherein the feedback loop computing unit is operable to send a command including the dampening frequency to the first and second actuators to oscillate the first and second wing extensions at the dampening frequency, thereby stabilizing the tiltrotor aircraft.

10. The tiltrotor aircraft as recited in claim 9 wherein the first and second wing extensions have oscillatory authority in a range of approximately 5 degrees to approximately −5 degrees.

11. The tiltrotor aircraft as recited in claim 9 wherein the mode of the wings has a phase angle; and wherein the first and second actuators are operable to oscillate the first and second wing extensions at a different phase angle than the phase angle of the mode of the wings such that the wings experience a dampening effect.

12. The tiltrotor aircraft as recited in claim 9 wherein the dampening frequency is in a range of approximately 0.5 Hertz to approximately 10 Hertz.

13. The tiltrotor aircraft as recited in claim 9 wherein the first and second rotor assemblies are rotatably coupled to inboard portions of the first and second fixed pylons, respectively.

14. A method for stabilizing a tiltrotor aircraft comprising:
receiving at least one stability parameter from at least one sensor coupled to a wing of the tiltrotor aircraft;
determining a frequency of a mode of the wing based on the at least one stability parameter from the at least one sensor on the wing to form a detected frequency value;
calculating a dampening frequency equal to the detected frequency value; and
sending a command including the dampening frequency to an actuator to oscillate a wing extension at the dampening frequency, thereby stabilizing the tiltrotor aircraft.

15. The method as recited in claim 14 wherein the command is sent from a feedback loop computing unit.

16. The method as recited in claim 14 wherein oscillating the wing extension at the dampening frequency to stabilize the tiltrotor aircraft further comprises moving the wing extension with approximately 5 degrees to approximately −5 degrees of oscillatory authority.

17. The method as recited in claim 14 wherein oscillating the wing extension at the dampening frequency to stabilize the tiltrotor aircraft further comprises oscillating the wing extension at a frequency in a range of approximately 0.5 Hertz to approximately 10 Hertz.

* * * * *